United States Patent
Bruna et al.

(10) Patent No.: US 11,475,238 B2
(45) Date of Patent: Oct. 18, 2022

(54) KEYPOINT UNWARPING FOR MACHINE VISION APPLICATIONS

(71) Applicant: STMICROELECTRONICS S.r.l., Agrate Brianza (IT)

(72) Inventors: Arcangelo Ranieri Bruna, Giardini Naxos (IT); Danilo Pietro Pau, Sesto San Giovanni (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 180 days.

(21) Appl. No.: 16/752,347

(22) Filed: Jan. 24, 2020

(65) Prior Publication Data

US 2020/0160102 A1    May 21, 2020

Related U.S. Application Data

(62) Division of application No. 13/869,639, filed on Apr. 24, 2013, now Pat. No. 10,579,904.

(Continued)

(51) Int. Cl.
*G06V 30/18*    (2022.01)
*G06T 3/00*    (2006.01)
(Continued)

(52) U.S. Cl.
CPC .......... *G06K 9/6228* (2013.01); *G06T 3/0093* (2013.01); *G06T 7/33* (2017.01);
(Continued)

(58) Field of Classification Search
CPC ................... G06K 9/46; G06K 9/4671; G06K 2009/6213; G06K 9/6211; G06K 2009/363; G06K 9/6201; G06K 9/6217; G06K 9/00268; G06K 9/6202; G06K 9/6215; G06K 9/00; G06K 9/6228; G06K 9/00523; G06K 9/629; G06T 7/246; G06T 7/337;
(Continued)

(56) References Cited

U.S. PATENT DOCUMENTS 5,694,334 A    12/1997    Donahue et al.
5,715,325 A    2/1998    Bang et al.
(Continued)

OTHER PUBLICATIONS

Provisional application specification U.S. Appl. No. 61/589,696 (corresponding to Chen U.S. Pat. No. 8,885,887), 21 pages, filed Jan. 23, 2012 [retrieved Mar. 1, 2022 via PE2E], (Year: 2012).*

(Continued)

*Primary Examiner* — Matthew C Bella
*Assistant Examiner* — Dennis Rosario
(74) *Attorney, Agent, or Firm* — Seed Intellectual Property Law Group LLP

(57) ABSTRACT

An image processing system has one or more memories and image processing circuitry coupled to the one or more memories. The image processing circuitry, in operation, compares a first image to feature data in a comparison image space using a matching model. The comparing includes: unwarping keypoints in keypoint data of the first image; and comparing the unwarped keypoints and descriptor data associated with the first image to the feature data of the comparison image. The image processing circuitry determines whether the first image matches the comparison image based on the comparing.

19 Claims, 10 Drawing Sheets

Related U.S. Application Data

(60) Provisional application No. 61/637,508, filed on Apr. 24, 2012.

(51) Int. Cl.
*G06K 9/62* (2022.01)
*H04N 19/57* (2014.01)
*G06T 7/33* (2017.01)
*G06T 7/73* (2017.01)
*G06V 10/24* (2022.01)
*G06V 10/40* (2022.01)
*G06V 10/46* (2022.01)

(52) U.S. Cl.
CPC .............. *G06T 7/337* (2017.01); *G06T 7/344* (2017.01); *G06T 7/75* (2017.01); *G06V 10/24* (2022.01); *G06V 10/40* (2022.01); *G06V 10/462* (2022.01); *G06V 30/18143* (2022.01); *H04N 19/57* (2014.11); *G06V 10/247* (2022.01)

(58) Field of Classification Search
CPC ........... G06T 7/33; G06T 7/344; G06T 5/006; G06T 3/0093; G06T 3/0062; G06T 3/00; G06T 7/248; G06T 7/74; G06T 3/0018; H04N 1/387; H04N 5/2628; H04N 1/3873; H04N 1/3876; H04N 19/54; G06V 10/243; G06V 40/103; G06V 10/40; G06V 10/462; G06V 10/46; G06V 10/44; G06V 40/171; G06V 40/168; G06V 20/46; G06V 30/18143; G06V 30/18152; G06V 10/467; G02B 2027/0138
See application file for complete search history.

(56) References Cited

U.S. PATENT DOCUMENTS

| | | | |
|---|---|---|---|
| 5,842,194 A | 11/1998 | Arbuckle | |
| 6,115,494 A | 9/2000 | Sonoda et al. | |
| 6,480,626 B1 | 11/2002 | Venable | |
| 6,639,624 B1 | 10/2003 | Bachelder et al. | |
| 6,667,766 B2 | 12/2003 | Matsutani et al. | |
| 6,687,402 B1 | 2/2004 | Taycher et al. | |
| 6,711,293 B1 | 3/2004 | Lowe | |
| 6,750,871 B2 | 6/2004 | Nishikawa | |
| 6,788,809 B1 | 9/2004 | Grzeszczuk et al. | |
| 6,810,293 B1 | 10/2004 | Chou et al. | |
| 6,871,409 B2 | 3/2005 | Robb et al. | |
| 6,971,066 B2 | 11/2005 | Schultz et al. | |
| 7,012,642 B1 | 3/2006 | Zell | |
| 7,073,158 B2 | 7/2006 | McCubbrey | |
| 7,330,604 B2 | 2/2008 | Wu et al. | |
| 7,460,686 B2 | 12/2008 | Yoda et al. | |
| 7,587,699 B2 | 9/2009 | McCubbrey | |
| 7,623,685 B2 | 11/2009 | Boult et al. | |
| 7,769,236 B2 | 8/2010 | Fiala | |
| 7,822,264 B2 | 10/2010 | Balslev et al. | |
| 7,860,387 B2 | 12/2010 | Ishikawa | |
| 8,068,674 B2 | 11/2011 | Goncalves | |
| 8,126,190 B2 | 2/2012 | Jung et al. | |
| 8,224,064 B1 | 7/2012 | Hassebrook et al. | |
| 8,270,671 B1 | 9/2012 | Medasani et al. | |
| 8,391,640 B1 | 3/2013 | Jin | |
| 8,416,985 B2 | 4/2013 | Martin et al. | |
| 8,421,868 B2 | 4/2013 | Hamada | |
| 8,437,558 B1 | 5/2013 | Medasani et al. | |
| 8,456,327 B2 | 6/2013 | Bechtel et al. | |
| 8,792,673 B2 | 7/2014 | Levien et al. | |
| 8,885,887 B1* | 11/2014 | Chen ...................... | G06T 7/246 345/611 |
| 8,942,418 B2 | 1/2015 | Kurz et al. | |
| 9,014,508 B2 | 4/2015 | Vigliar et al. | |
| 9,020,276 B2 | 4/2015 | Vigliar et al. | |
| 9,025,817 B2 | 5/2015 | Knauth | |
| 9,342,886 B2 | 5/2016 | Grzechnik | |
| 9,569,695 B2 | 2/2017 | Pau et al. | |
| 9,600,744 B2 | 3/2017 | Pau et al. | |
| 2004/0136611 A1 | 7/2004 | Reiners | |
| 2007/0241863 A1 | 10/2007 | Udagawa et al. | |
| 2007/0273766 A1 | 11/2007 | Wilson | |
| 2007/0274387 A1 | 11/2007 | Kurahashi | |
| 2007/0280547 A1 | 12/2007 | Mitsui | |
| 2008/0056607 A1 | 3/2008 | Ovsiannikov | |
| 2008/0101715 A1 | 5/2008 | Barnes et al. | |
| 2008/0181457 A1 | 7/2008 | Chattopadhyay et al. | |
| 2008/0239330 A1 | 10/2008 | Sato | |
| 2008/0267506 A1 | 10/2008 | Winder | |
| 2008/0291274 A1 | 11/2008 | Merkel et al. | |
| 2008/0298689 A1 | 12/2008 | Ashbrook et al. | |
| 2010/0020223 A1 | 1/2010 | Vice | |
| 2010/0215266 A1 | 8/2010 | Higuchi | |
| 2010/0232643 A1 | 9/2010 | Chen et al. | |
| 2010/0310174 A1* | 12/2010 | Reznik ................. | G06K 9/4642 382/190 |
| 2010/0328316 A1 | 12/2010 | Stroila et al. | |
| 2011/0044543 A1 | 2/2011 | Nakamura et al. | |
| 2011/0069175 A1 | 3/2011 | Mistretta et al. | |
| 2011/0103458 A1 | 5/2011 | Huang et al. | |
| 2011/0194731 A1* | 8/2011 | BenHimane ........... | G06V 20/00 382/103 |
| 2011/0216948 A1 | 9/2011 | Yalla et al. | |
| 2011/0228846 A1 | 9/2011 | Eilat et al. | |
| 2012/0051661 A1* | 3/2012 | Minakawa ............ | G06T 3/0018 382/274 |
| 2012/0140233 A1 | 6/2012 | Rockwell et al. | |
| 2012/0163672 A1 | 6/2012 | McKinnon | |
| 2012/0182392 A1 | 7/2012 | Kearns et al. | |
| 2012/0183224 A1 | 7/2012 | Kirsch | |
| 2013/0077890 A1* | 3/2013 | Chen ....................... | G06T 5/002 382/275 |
| 2013/0088426 A1 | 4/2013 | Shigeta et al. | |
| 2013/0250113 A1 | 9/2013 | Bechtel et al. | |
| 2013/0279762 A1 | 10/2013 | Pau et al. | |
| 2013/0293469 A1 | 11/2013 | Hakoda et al. | |
| 2013/0301930 A1 | 11/2013 | Vigliar et al. | |
| 2013/0301950 A1 | 11/2013 | Vigliar et al. | |
| 2013/0322524 A1 | 12/2013 | Jang et al. | |
| 2014/0002658 A1 | 1/2014 | Kim et al. | |
| 2014/0049373 A1 | 2/2014 | Troy et al. | |
| 2014/0185910 A1 | 7/2014 | Bryll et al. | |
| 2014/0293091 A1 | 10/2014 | Rhoads et al. | |
| 2015/0172576 A1 | 6/2015 | Erbudak | |
| 2016/0112647 A1 | 4/2016 | Mercier et al. | |

OTHER PUBLICATIONS

Mirzaalian et al., A Graph-based Approach to Skin Mole Matching Incorporating Template-Normalized Coordinates, Jun. 20-25, 2009 [retrieved Mar. 1, 2022], 2009 IEEE Conference on Computer Vision and Pattern Recognition, pp. 2152-2159. Retrieved: https://ieeexplore.ieee.org/abstract/document/5206725 (Year: 2009).*

Murillo et al., Gist vocabularies in omnidirectional images for appearance based mapping and localization, Internet Archive, Feb. 17, 2012 (captured) [retrieved Jun. 1, 2022], 9 pages. Retrieved: (Year: 2012) https://web.archive.org/web/20120217071932/http://cs.gmu.edu:80/~kosecka/Publications/omnivis-final-2010.pdf (Year: 2012).*

"Hamming distance," retrieved from http://en.wikipedia.org/wiki/Hamming_distance on Jul. 30, 2014, 3 pages.

"A dual-conversion-gain video sensor with dewarping and overlay on a single chip," to A. Huggett et al., 2009 IEEE International Solid-State Circuits Conference, Session 2, Imagers, 2,8.

ProDSP Technologies, "Event Detection Intelligent Camera," retrieved from http://www.prodsp.hu/event-detection-intelligent-camera/ on Feb. 9, 2015, 5 pages.

Basu, "Gaussian-Based Edge-Detection Methods—A Survey," IEEE Trans. on Systems, Man and Cybernetics—Part C, 32(3):252-260, 2002.

(56) References Cited

OTHER PUBLICATIONS

Bonato et al., "A Parrallel Hardware Architecture for Scale and Rotation Invariant Feature Detection," IEEE Trans. on Circuits and Systems for Video Tech. 18(12): 1703-1712, Dec. 2008.

Bradski et al., Learning Open CV Computer Vision . . . .

Calonder et al., "BRIEF: Computing a Local Binary Descriptor Very Fast," *IEEE Transactions on Pattern Analysis and Machine Intelligence* 34(7):1281-1298, Jul. 2012.

Chen et al., "Hardware Oriented Content-Adaptive Fast Algorithm for Variable Block-Size Integer Motion Estimation in H.264," *Proceedings of the 2005 International Symposium on Intelligent Signal Processing and Communication Systems*, Hong Kong, China, Dec. 13-16, 2005, pp. 341-344.

Hess, "An Open Source SIFT Library," ACM Proc. of the Int. Conference on <ultimedia (MM), Florence, Italy, 2010, http://robwhess.github.io/opensift/.

http://en.wikipedia.org/wiki/Motion_estimation, last modified Mar. 24, 2015, retrieved Nov. 10, 2015.

Huang, "High-Performance SIFT Hardwaare Accelerator for Real-Time Image Feature Extraction," IEEE Trans. on Circuits and Systems for Video Tech, 22(3):340-351, Mar. 2012.

Kim et al. "Computer Control by Tracking Head Movements for the Disabled," *Lecture Notes in Computer Science: Computers Helping People with Special Needs*, ICCHP 2006, vol. 4061, pp. 709-715, 2006.

Lai et al. "Proposed FPGA Hardware Architecture for High Frame Rate (>100 fps) Face Detection Using Feature Cascade Classifiers" Biometrics: Theory, Applications, and Systems, 2007. BTAS 2007, First IEEE International Conference on (Sep. 2007) pp. 1-6.

Lowe, "Distinctive Image Features from Scale-Invariant Keypoints," International Journal of Computer Vision 60(2):91-110, 2004.

Lucas et al., "An Iterative Image Registration Technique with an Application to Stereo Vision," Proceedings of Imaging Understanding Workshop, pp. 121-130 (1981).

Mizuno et al., "A Low-Power Real-Time SIFT Descriptor Generation Engine for Full HDTV Video Recognition," IEICE Trans. Electron, E94-C(4):448-457, Apr. 2011.

O'Shea, "Bachet's problem: as few weights to weigh them all," arXiv: 1010.5486v1 [math.HO], Oct. 26, 2010, pp. 1-15.

Park, "The r-complete partitons," Discrete Mathematics 186:293-297, 1998.

Pettersson et al., "Online stereo calibration using FPGAs," IEEE, 2005.

Psyllos et al., "Vehicle Logo Recognition Using a SIFT-Based Enhanced Matching Scheme," *IEEE Transactions on Intelligent Transportation Systems* 11(2):322-328, 2010.

Rosten et al., "Faster and Better: A Machine Learning Approach to Corner Detection," *IEEE Transactions on Pattern Analysis and Machine Intelligence* 32(1):105-119, Jan. 2010.

\* cited by examiner

KEYPOINT UNWARPING FOR MACHINE VISION APPLICATIONS

BACKGROUND

Technical Field

The technology relates to machine vision, and to electronic processing of captured images to identify one or more features in the captured images.

Description of the Related Art

The detection of features within electronically-captured images is useful for a variety of machine-vision applications. For example, feature detection may be used in machine-implemented methods relating to feature matching, localization, mapping, tracking, and/or object recognition. Examples of image features include, without being limited to, edges, corner, ridges, localized contrasted regions, and blobs.

Several algorithms, of differing levels of complexity, have been developed to identify and extract features from an image. Some of these algorithms are designed to provide feature detection and matching that is independent from certain geometric transformations, such as image translation, scale, and rotation. One algorithm, referred to as Scale-Invariant Feature Transform (SIFT), extracts keypoints (also referred to as characteristic points, feature points, or interest points) and generates a descriptor for each keypoint. The descriptor is a string that may be independent from geometric transformation. The keypoints and/or descriptors may be used to identify and/or track features in one or more images, or otherwise used for machine-vision applications. (See, for example, David G. Lowe, "Distinctive Image Features from Scale-Invariant Keypoints", International Journal of Computer Vision, 60, 2 (2004), pages 91-110, which is incorporated herein by reference in its entirety). Another algorithm, referred to as Compressed Histogram of Gradients (CHoG), provides a solution in a compressed image domain. It is designed to provide good performance with reduced-size data sets for features. Another algorithm, referred to as Speeded Up Robust Features (SURF), represents an improvement in speed over SIFT and provides fast feature detection with robustness to certain image transformations, and with less computational resources.

BRIEF SUMMARY

Methods and apparatus configured to unwarp at least portions of electronically-captured images are described. Unwarping may be applied to keypoints in captured images, where the captured images may include image distortion. The unwarped keypoints may be used in various machine-vision algorithms, e.g., image matching, localization, mapping, tracking, and/or object recognition. In various embodiments, machine-vision algorithms using the unwarped keypoints may provide reliable machine-vision processing results for images captured with similar or different optoelectronic systems.

According to some embodiments, an image processing system having at least one processor adapted to process image data comprises a keypoint extractor configured to receive image data representative of a first image. The keypoint extractor may be further configured to identify a plurality of keypoints within the image data and generate first keypoint data. The image processing system may further include a keypoint transformer configured to transform the first keypoint data to second keypoint data based upon an image deformation model, and a descriptor configured to produce, from the image data that has not been transformed based upon the image deformation model, descriptor data for at least some of the plurality of keypoints.

In some implementations, an image processing system having at least one processor adapted to process image data comprises a matching model generator configured to receive image deformation data associated with a distorted image and to identify a matching model to a feature matcher. The feature matcher may be configured to determine whether one or more features match between a captured image and at least one comparison image. The feature matcher may be configured to receive keypoint data and descriptor data obtained from a distorted image, the matching model from the matching model generator, and feature data associated with at least one comparison image. The feature matcher may further be configured to unwarp keypoints in the keypoint data in accordance with the received matching model.

Methods of keypoint unwarping are also contemplated. In some embodiments, an image processing method for electronically processing image data by at least one processor so as to implement keypoint unwarping comprises receiving, by a keypoint extractor, image data representative of a first image, and identifying, by the keypoint extractor, a plurality of keypoints within the image data. The method may further comprise generating, by the keypoint extractor, first keypoint data corresponding to the plurality of identified keypoints, and transforming, by a keypoint transformer, the first keypoint data to second keypoint data based upon an image deformation model. In some implementations, the method may further include producing, by a descriptor, from the image data that has not been transformed based upon the image deformation model, descriptor data for at least some of the plurality of keypoints.

According to some embodiments, a method implementing keypoint unwarping at a downstream location in an image processing system that includes at least one processor may comprise receiving, by a matching model generator, image deformation data associated with a distorted image, and identifying, by the matching model generator, a matching model to a feature matcher. The method may further include receiving, by the feature matcher, keypoint data obtained from a distorted image, and unwarping, by the feature matcher, the keypoint data in accordance with the identified matching model. The unwarped keypoint data may be used by the feature matcher when determining whether one or more features match between a captured image and at least one comparison image.

Embodiments also include storage devices containing machine-readable instructions to specially adapt image processing apparatus to implement keypoint unwarping. In some embodiments, keypoint unwarping is implemented as computer-readable medium including machine-readable instructions that, when executed by at least one processor, adapt the at least one processor to receive image data representative of a first image and identify a plurality of keypoints within the image data. The machine-readable instructions may further adapt the at least one processor to generate first keypoint data corresponding to the plurality of identified keypoints, and transform the first keypoint data to second keypoint data based upon an image deformation model. In some implementations, the machine-readable instructions may further adapt the at least one processor to produce from the image data that has not been transformed based upon the image deformation model, descriptor data for at least some of the plurality of keypoints.

In some applications, keypoint unwarping may be implemented as computer-readable medium including machine-readable instructions that, when executed by at least one processor, adapt the at least one processor to receive image deformation data associated with a distorted image, and identify a matching model to a feature matcher. The matching model identified to the feature matcher may be based upon the image deformation data. The machine-readable instructions may further adapt the at least one processor to receive keypoint data obtained from a distorted image, and unwarp the keypoint data in accordance with the identified matching model. The unwarped keypoint data may be used by the feature matcher when determining whether one or more features match between a captured image and at least one comparison image.

The foregoing summary is provided by way of illustration and is not intended to be limiting.

BRIEF DESCRIPTION OF THE DRAWINGS

In the drawings, each identical or nearly identical component that is illustrated in various figures is represented by a like reference character. For purposes of clarity, not every component may be labeled in every drawing.

DETAILED DESCRIPTION

Figure 1A:
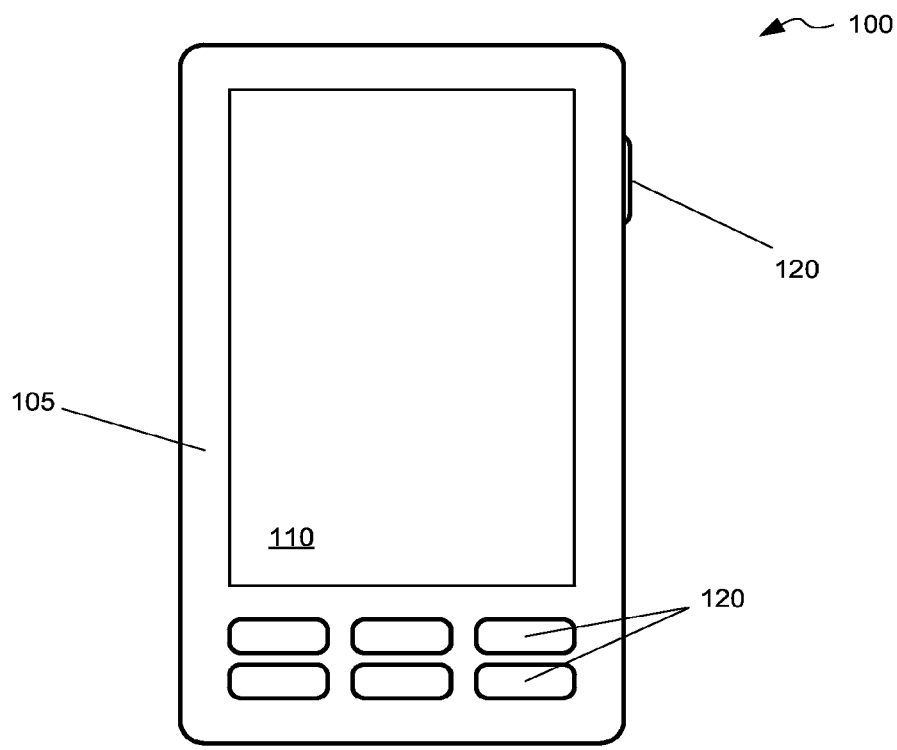
FIG. 1A depicts a device, e.g., a smart phone, in which embodiments of the present technology may be implemented.

FIG. 1A depicts a device 100 (e.g., a smart phone, camera, personal digital assistant, pad or tablet computer) in which embodiments of keypoint unwarping may be implemented. The device may be a hand-held, mobile device, or may be a larger electronic device such as a laptop or personal computer. The device 100 may include a casing 105 and display screen 110, which may be a touch screen. The device may contain one or more operational buttons 120 that may be used to operate the device. Within the casing 105 may be complex digital and analog circuitry configured to provide a variety of operational functions, e.g., still and/or video image recording, audio recording, graphic display on the screen 110, audio reproduction, numerical computation, word processing, and electronic communications with other devices in a network. In some embodiments, the device 100 may be distributed or integrated in a larger apparatus, such as a vehicle, surveillance system, or an electronic gaming system.

Figure 1B:
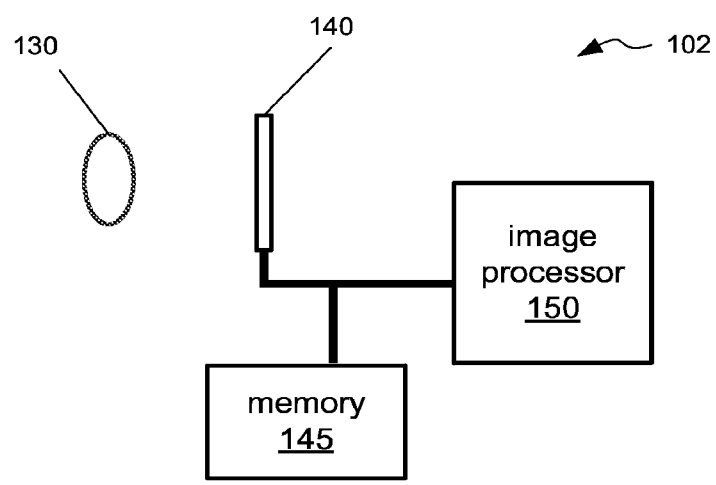
FIG. 1B depicts components of image-capture apparatus, according to some embodiments.

According to some embodiments, the device 100 may include image-capture apparatus 102, as depicted in FIG. 1B. The image-capture apparatus may comprise at least one optical lens 130 and a photosensor array 140. The photosensor array 140 may comprise a CMOS photosensor array, or any other suitable photosensing array, and include a plurality of imaging pixels that are configured to convert incident photons that are integrated over a short, predetermined time interval into an electronic signal. The electronic signal may be read out from each pixel in the sensor array 140. Data read from the pixels may be stored in memory 145 and/or provided to an image processor 150. The data read from pixels may be formatted into a frame format, or any suitable format, and be representative of a captured image. The data may contain monochrome information and/or color information that may be used to reproduce the captured image.

The image processor 150 may include circuitry configured to execute some or all of the keypoint unwarping functionality described below. In some embodiments, the image processor may be configured to execute other or additional image processing functions, e.g., filtering, data compression, data formatting, etc. The memory 145 and image processor 150 may be in communication with other components of the device 100, e.g., in communication with at least one processor of the device 100.

Figure 2A:
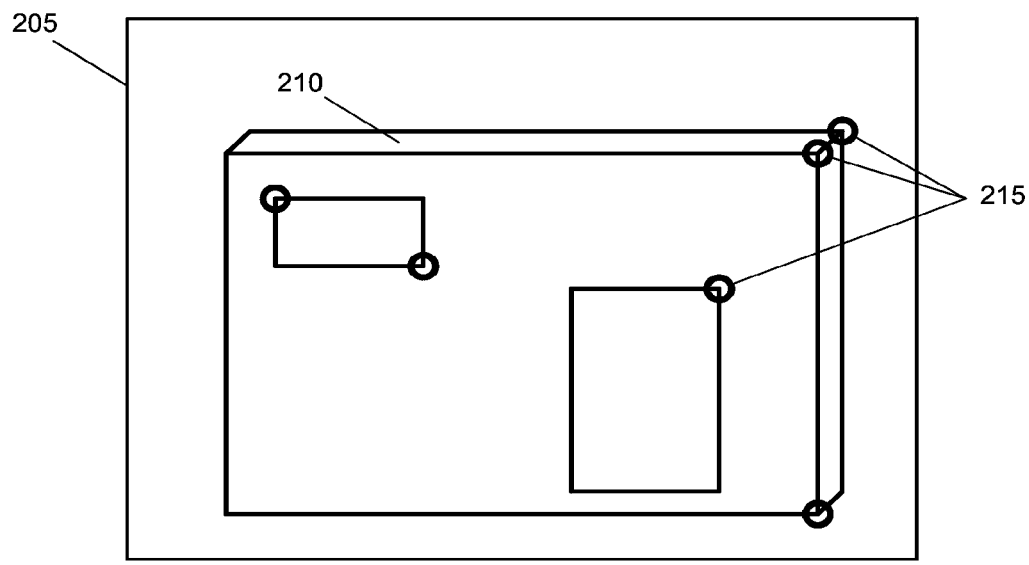
FIG. 2A is a depiction of an electronically-captured, two-dimensional image of an object 210, as captured from a first perspective view.
Figure 2B:
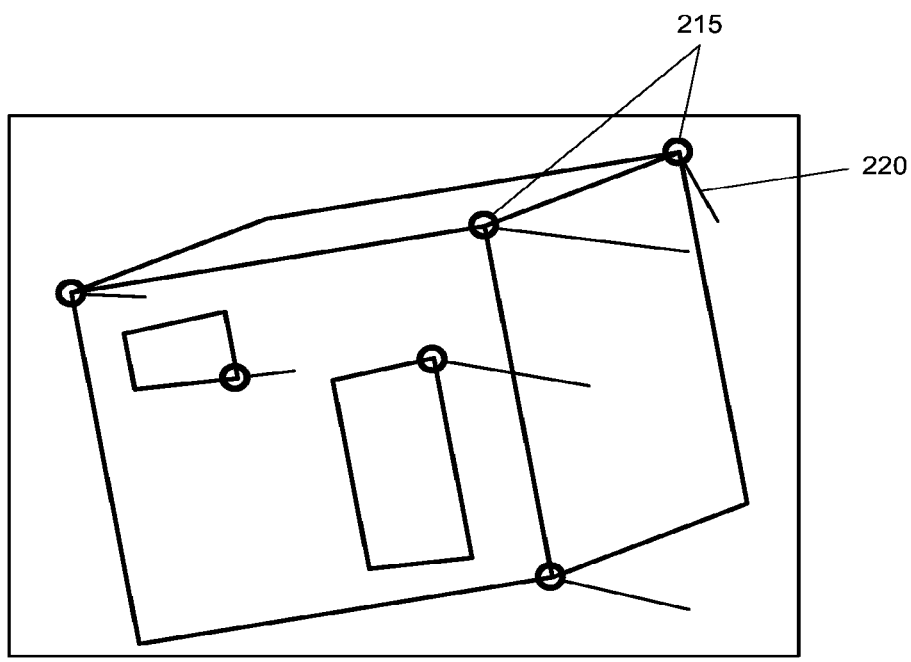
FIG. 2B is a depiction of an electronically-captured, two-dimensional image of the object 210 of FIG. 2A, as captured from a second perspective view.

For teaching purposes, FIG. 2A depicts a representation of a first electronically-captured, two-dimensional image 205 of an object 210. The image may have been captured from a first perspective view with the device 100. FIG. 2B depicts a representation of a second electronically-captured, two-dimensional image of the same object 210, but captured from a second perspective view. The image of FIG. 2B may have been captured with the same device 100 or with a different device.

Shown in both images in FIGS. 2A and 2B are keypoints 215. A keypoint may be one or more points or pixels in an image having well defined position(s) and a high amount of informational content (e.g., image texture) in the local vicinity of the keypoint. A keypoint may sometimes be referred to as an interest point. As noted above, keypoints 215 may be extracted from an image and associated descriptors generated using any suitable keypoint algorithm, e.g., SIFT, SURF, CHoG, etc. A descriptor may be generated from image texture in the immediate vicinity of a keypoint. In some embodiments, a descriptor may be generated from an N×M pixel region of the image that includes the keypoint. In some implementations, N=M=16. In other implementations, N≠M, and N or M may take on an integer value less than or greater than 16. There may be many keypoints extracted from an image, e.g., more than 100 in some embodiments, more than 1000 in some embodiments, and more than 10,000 in some embodiments.

Keypoints and descriptors, once obtained, may be used in machine-vision applications to identify and/or track features in an image or in successive images, or used for other machine-vision functions. For example, a device 100 equipped with machine-vision functionality may extract keypoints and generate descriptors for an image of an historical building or scene. The keypoints and/or descriptors may be compared against keypoints and/or descriptors of stored images to find a best match and thereby recognize the building or scene. Once recognized, textual, audio, video, and/or other information associated with the historical building or scene may be obtained from a data store or the internet, and the information obtained may be provided to the user of the device 100 in near real time. Other machine-vision functions may include localization, mapping, and/or 3D reconstruction of one or more objects within a captured image or a sequence of captured images.

As may be appreciated, images of an object 210 may not always be captured from the same perspective view, as shown in FIG. 2B. For example, an image may be captured from different locations with respect to the object, or an object with a sequence of images may be in motion. The changes in perspective views may also include rotational and/or magnification changes. A challenge in machine-vision application is to achieve feature matching and accurate machine-vision performance over a wide range of perspective views of an object.

To achieve satisfactory machine-vision performance, a high percentage of keypoints 215 should match between images captured from different perspective views or within a sequence of images. The ratio of matched keypoints to total keypoints in an image is sometimes referred to as recognition rate. FIG. 2B indicates that five of the six keypoints extracted from FIG. 2B match correctly to corresponding features in FIG. 2A. In FIG. 2B, the comet tails 220 indicate the location of a corresponding "matched" keypoint identified in FIG. 2A. The left-most keypoint, in the upper left corner of the image, does not match correctly.

Figure 3A:
FIG. 3A is a photographic image of a scene obtained using a fish-eye lens.
Figure 3B:
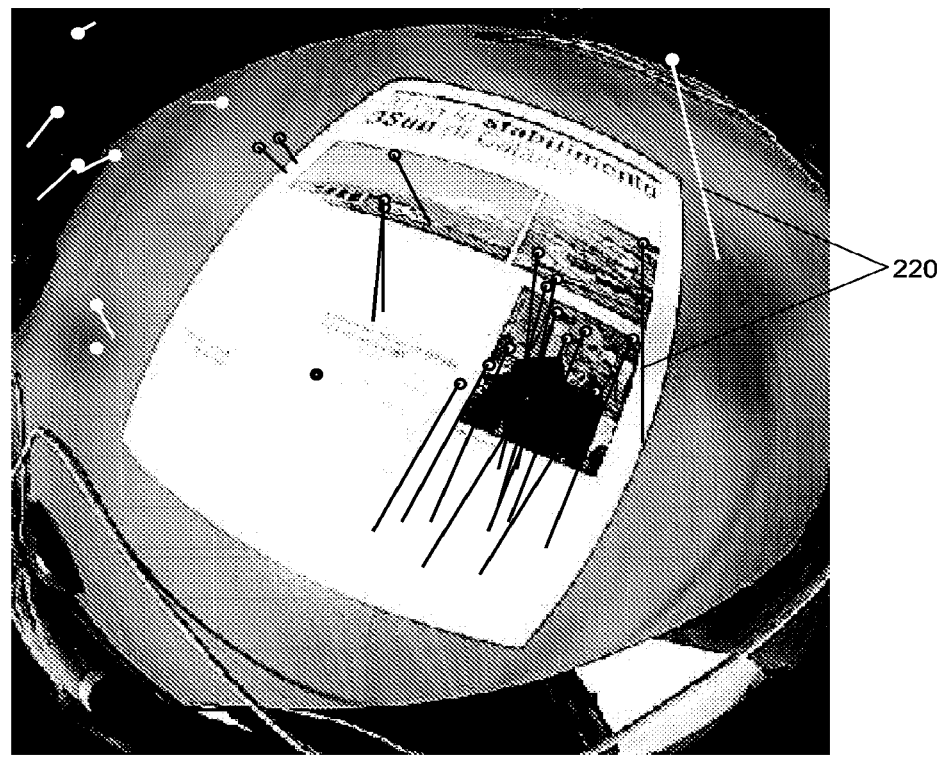
FIG. 3B is a photographic image of the scene of FIG. 3A in which an object within the field of view has been rotated.

FIGS. 3A and 3B show an example of feature matching in photographic images captured using a fish-eye lens. Although an image-capture system that uses a fish-eye lens can capture a wide field of view, it introduces a deformation or distortion into the captured image. In this case, the deformation comprises a barrel distortion of the object, a rectangular printed sheet. Although the lens has introduced distortion, the inventors have observed that keypoint and feature matching is still possible when the sheet is rotated. The keypoints 215 and comet tails 220 show a high percentage of matched keypoints between the images of FIG. 3A and FIG. 3B.

Figure 4A:
FIG. 4A is a photographic image of a scene obtained using a low-distortion wide-angle lens.
Figure 4B:
FIG. 4B is a photographic image of the scene of FIG. 4A obtained using a fish-eye lens.

In many cases, matching of a high percentage of keypoints, or achieving a high recognition rate, can be obtained provided the image deformation introduced by the image-capture system or systems is substantially the same among the compared images. However, the inventors have observed that when images are captured with image-capture systems that introduce different types or amounts of image distortion, matching of keypoints and features may not be possible, as depicted in FIGS. 4A and 4B for example, or may be at such a low percentage that machine-vision functions fail. FIG. 4A is a photographic image of a scene captured using a low-distortion, wide-angle lens, and FIG. 4B is a photographic image of the same scene captured using a fish-eye lens and at a counterclockwise rotation. The low-distortion, wide-angle lens introduces little distortion, so that an object in a captured image appears substantially the same as it would to an unaided eye. In this case, the image processing system fails to identify any matched features or keypoints between the two images.

Further, the inventors have recognized that in some instances, matching or machine-vision functions may fail even when an object is captured with a same image-capture system that introduces image deformation. For example, matching may fail on two images captured with the same system where an object of interest is in a first location, e.g., near the center, in the first image, and in a second location, e.g., near an edge, in the second image. In this case, the object may be distorted differently at the two locations. Also, problems may arise when the images are represented in a different geometric space, e.g., when a cylindrical geometric space is used for stitched images in one representation.

One approach to counter the effect of image distortion introduced by an image-capture system is to compensate or unwarp the recorded image to a common image destination space prior to extracting keypoints. Any suitable method for unwarping the image may be employed. According to some embodiments, a dewarping scheme, with optional perspective correction, as described in "A dual-conversion-gain video sensor with dewarping and overlay on a single chip," to A. Huggett et al., 2009 IEEE International Solid-State Circuits Conference, Session 2, Imagers, 2.8, an incorporated herein by reference in its entirety, may be employed to unwarp and compensate imaging distortion of an image prior to extracting keypoints and generating descriptors. The inventors have found that full-image unwarping may be suitable in some applications, but may fail in other applications. For example, full-image unwarping can introduce blurring that can cause keypoint extraction and/or feature matching to fail. Also, full-image unwarping requires an appreciable amount of memory and image processing resources.

According to some embodiments, undesirable effects of image distortion may be countered by unwarping only extracted keypoints in an image-processing system, and using the unwarped keypoint data for subsequent machine-vision applications. In some embodiments, the full image is not unwarped, reducing a demand for memory and processing resources. In some implementations, a captured, deformed image may be processed to extract keypoints and to generate descriptors for the extracted keypoints. Subsequently, only the keypoints are unwarped, e.g., in terms of keypoint locations. The image, or even regions around each identified keypoint, need not be unwarped. The unwarped keypoint data and descriptor data may then be used in a machine-vision application, e.g., feature matching, tracking, localization, mapping, etc.

Figure 5A:
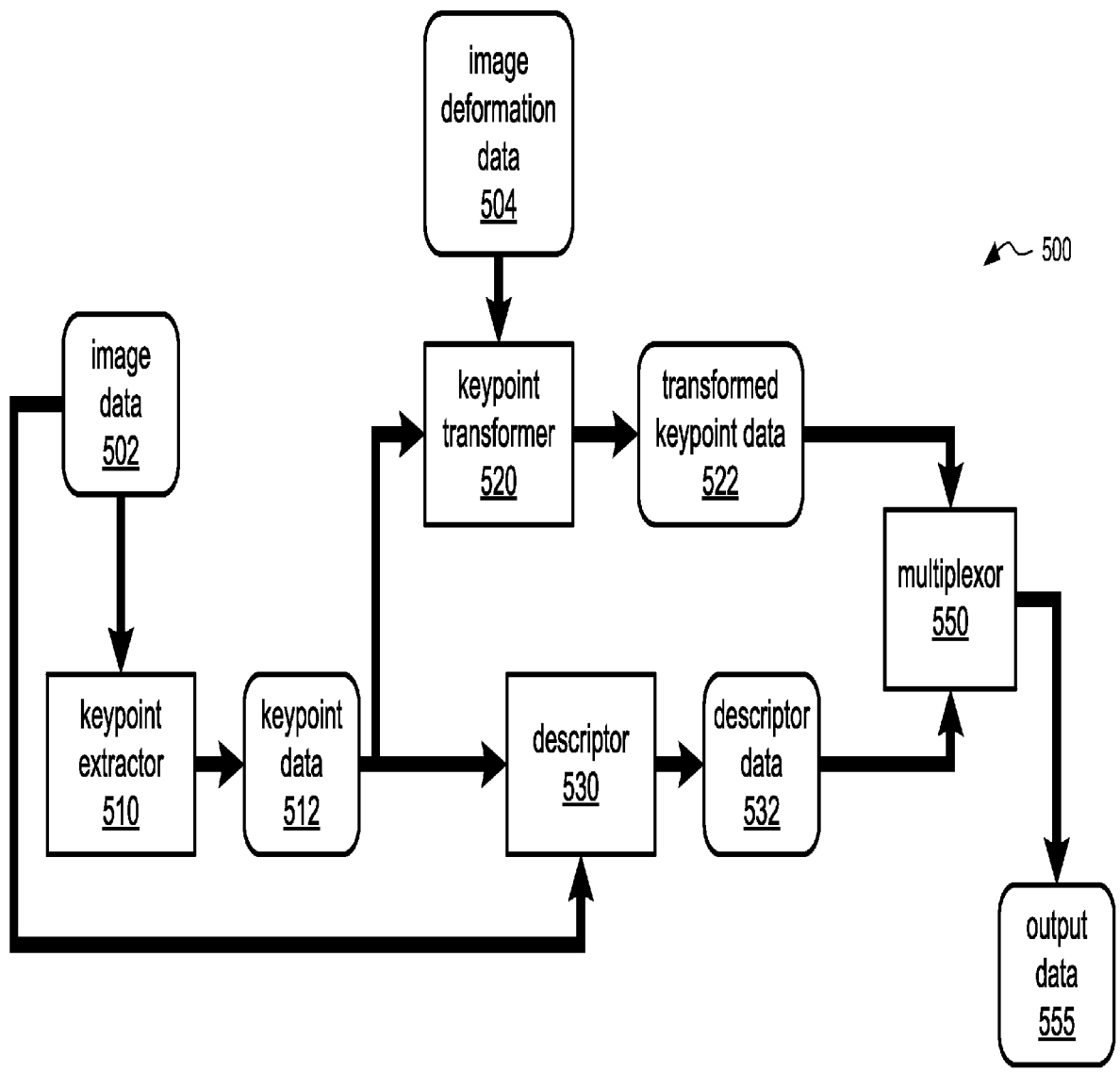
FIG. 5A depicts components of an image processing system, according to some embodiments.

FIG. 5A depicts an image-processing system 500 configured to unwarp keypoints, according to some embodiments. The image-processing system may comprise a keypoint extractor 510, a keypoint transformer 520, a descriptor 530 and a multiplexor 550. In overview, the keypoint extractor 510 is configured to identify or extract keypoints 215 from received image data 502 and produce keypoint data 512 that is communicated to the keypoint transformer 520 and descriptor 530. The keypoint transformer 520 may unwarp certain keypoint data and communicate transformed keypoint data 522 to the multiplexor. The descriptor 530 may generate descriptor data 532 for each, or a majority, of the identified keypoints and communicate descriptor data to the multiplexor 550. The multiplexor may combine the received data into output data 555. The output data may be processed downstream in a machine-vision application.

With regard to communicating information between system components, a first system component may communicate a value to a second system component in any one of several methods. For example, a first system component may provide an address location or pointer to the second system component identifying where the value is stored, or may place the computed value in an address accessed by the second component and notify the second component when the computed value is available. Alternatively, the first system component may transmit the value as digital or analog data, directly or indirectly, to the second system component.

The keypoint extractor 510 may comprise digital and/or analog hardware, software executing on at least one processor, at least one field-programmable gate array, or a combination thereof configured to receive captured image data 502, and process the image data to identify or extract keypoints 215. The image data 502 may be multi-bit, formatted data representative of an image captured by image-capture apparatus 102, for example. The captured image may include image deformation introduced by the image-capture apparatus. The keypoints may be extracted according to any suitable keypoint extraction algorithm as described above, e.g., SIFT, SURF, CHoG, etc.

The term "software" may be used herein to refer to machine-readable instructions that are recognizable and executable by at least one processor. The machine-readable instructions may be embodied in any type of programming language, and stored on at least one manufacture storage device, e.g., RAM, ROM, cache memory, CD-ROM, removable memory devices, etc.

In some embodiments, keypoint extractor 510 may also determine geometric or orientation parameters for a keypoint associated with a received image, or with a region of the image around an associated keypoint. For example, the keypoint extractor 510 may provide a coordinate position (x, y) for each extracted keypoint. The coordinate position may identify the location of the keypoint within the captured image, and may be expressed in terms of pixel numbers. In some implementations, the keypoint extractor may determine one or more rotational values associated with the received image or sub-regions of the image. The rotational values may reflect any one or more of pitch $\theta_x$, yaw $\theta_z$, and roll $\theta_y$ of an object in the image. In some embodiments, the keypoint extractor 510 may determine one or more magnification M values associated with the received image and/or sub-regions of the image.

The keypoint extractor 510 may produce keypoint data 512 as output data. The keypoint data 512 may comprise a combination of data received and/or produced by the keypoint extractor, and may be formatted in any suitable format. In some implementations, keypoint data may comprise for any one keypoint an identifier for the keypoint, a position for the keypoint, an orientation of the keypoint, and a magnification associated with the keypoint. For example, the keypoint data 512 for any one keypoint may be represented by data values [x, y, $\theta_y$, M]. In some embodiments, additional or less data may be provided for any one keypoint. In some embodiments, keypoint data may include some or all of image data 502 that is received by the keypoint extractor 510. In some implementations, keypoint data 512 may be prepared as metadata and attached to, or associated with, some or all of image data 502. The keypoint data 512 may be communicated to keypoint transformer 520 and descriptor 530.

Keypoint transformer 520 may comprise digital and/or analog hardware, software executing on at least one processor, at least one field-programmable gate array, or a combination thereof configured to transform at least a portion of the received keypoint data 512 according to an image deformation model. In some embodiments, the keypoint transformer 520 may be configured to unwarp only the position of a keypoint 215 according to the image deformation model. In some implementations, the keypoint transformer 520 may be additionally configured to unwarp a rotation and/or magnification for a keypoint according to the image deformation model.

By unwarping only keypoints 215, the received image may not be modified and blurring may not be introduced, as would occur in full-image unwarping. Further, since only keypoints are unwarped, the image-processing requirements for unwarping may be significantly reduced. For example, as compared to full-image unwarping, only a fraction of the image data is unwarped. The fraction may be less than 10% in some embodiments, less than 5% in some embodiments, less than 2% in some embodiments, less than 1% in some embodiments, less than 0.5% in some embodiments, and yet less than 0.2% in some embodiments. In some implementations, the fraction may be approximately 0.3%.

The keypoint transformer 520 may receive image deformation data 504 that is associated with image distortion introduced by the image-capture system 102. The image deformation data 504 may comprise at least one parametric equation associated with the image distortion, in some embodiments. In some implementations, the image deformation data 504 may comprise a look-up table (LUT) having values associated with the image distortion introduced by the image-capture system, e.g., values associated with image distortion tabulated as a function of position within an image frame. In various embodiments, the image deformation data 504 may represent an inverse operation of the associated image distortion introduced by the image-capture system 102. The image deformation data 504 may be provided by the image-capture system, e.g., determined by an image-processor 150 based upon a calibration procedure, or may be provided from another source, e.g., selected from a menu by a user and loaded from a data store, or selected and loaded automatically from a data store of previously-determined or common image deformation models associated with various image-capture systems.

The keypoint transformer 520 may provide as output transformed keypoint data 522 that may be encoded in any suitable format. The transformed keypoint data may be produced as a result of the unwarping executed by the keypoint transformer 520. For example, the keypoint transformer may apply an inverse distortion operation on received keypoint data 512, so as to substantially remove distortions introduced by the image-capture system 102. The inverse distortion operation may substantially map received keypoint data 512 from a distorted image space to a destination image space. The destination image space may be any suitable image space, e.g., a linear, distortion-free image space, a cylindrical image space, a spherical image space, a three-dimensional image space. In some embodiments, the destination image space may be a non-linear image space, or an image space with a selected distortion. The destination image space may be a common image space that is used for comparison images or image features.

As a simple example that is not intended to be limiting, the keypoint transformer 520 may receive image deformation data 504 associated with an image-capture system that exhibits barrel distortion. The keypoint transformer 520 may then apply an inverse operation that maps one or more of positions (x, y), rotation ($\theta$), and magnification (M) of received keypoints to transformed keypoint data (x', y', θ', M') that would be representative of an undistorted image in linear, two-dimensional Cartesian image space. The transformed keypoint data 522 may then be provided to multiplexor 550. In another example, the keypoint transformer 520 may apply an operation that maps one or more of positions (x, y), rotation (θ), and magnification (M) of received keypoints in an image obtained with a low-distortion, wide-angle lens to respective positions, rotation, and Magnification (x', y', θ', M') in a destination barrel-distorted image space, e.g., where the comparison image may only be available in a fish-eye format.

Descriptor 530 may comprise digital and/or analog hardware, software executing on at least one processor, at least one field-programmable gate array, or a combination thereof configured to generate descriptor data 532 for one or more of the keypoints 215 identified in the received keypoint data 512. Descriptor data may be generated using any suitable descriptor algorithm, such as those used in SIFT, SURF, CHoG, or those described by M. Calonder et al. in "BRIEF: Computing a local binary descriptor very fast," *IEEE Transactions on Pattern Analysis and Machine Intelligence*, vol. 34, num. 7, pp. 1281-1298 (2011), or by E. Rosten et al. in "Faster and better: a machine learning approach to corner detection," *IEEE Transactions on Pattern Analysis and Machine Intelligence*, Vol. 32, Issue 1, pp. 105-119 (2010), both articles which are incorporated herein by reference in their entirety. The descriptor 530 may also receive image data 502 that is used to generate the descriptors. The received image data 502 may not be unwarped. The descriptor data 532 may be communicated to multiplexor 550.

Multiplexor 550 may comprise digital and/or analog hardware, software executing on at least one processor, at least one field-programmable gate array, or a combination thereof configured to combine transformed keypoint data 522 and descriptor data 532 into output data 555. The output data may comprise blocks of data for each keypoint 215, in some embodiments. A block of data may comprise keypoint data and associated descriptor data. In other embodiments, each keypoint may have a unique identifier that is used to associate its keypoint data with descriptor data, and keypoint and descriptor data may be provided in separate data blocks, or even in separate communication channels. Output data 555 may be provided as a bit stream to at least one downstream processor.

Figure 5B:
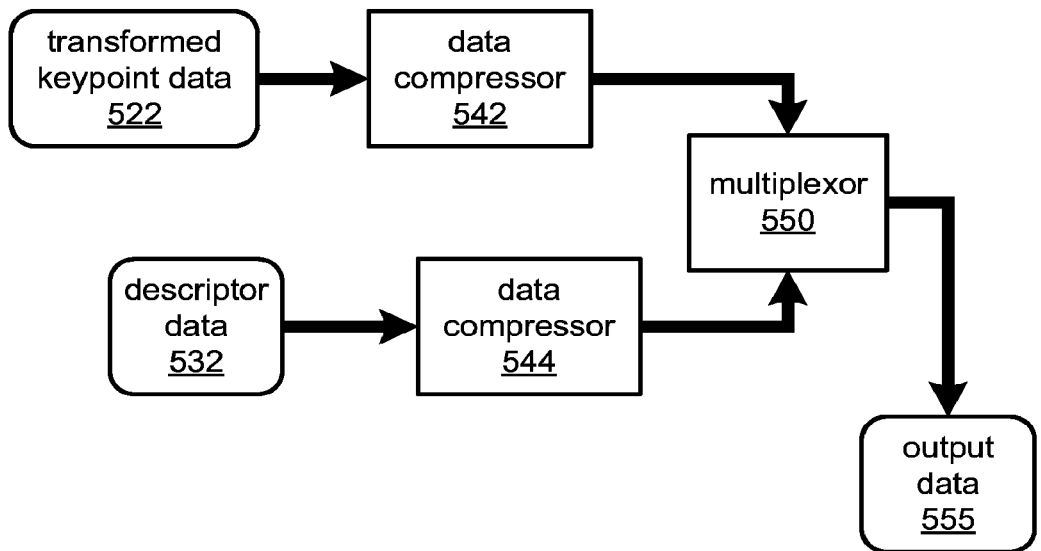
FIG. 5B depicts components of an image processing system, according to some embodiments.

According to some embodiments, data compression may be employed prior to multiplexing, as depicted in FIG. 5B. In some embodiments, one or both of transformed keypoint data 522 and descriptor data 532 may be provided to one or more data compressors 542, 544. A data compressor 542 may comprise digital and/or analog hardware, software executing on at least one processor, at least one field-programmable gate array, or a combination thereof configured to compress or reduce the bit size of received data. Any suitable form of data compression may be used.

Figure 5C:
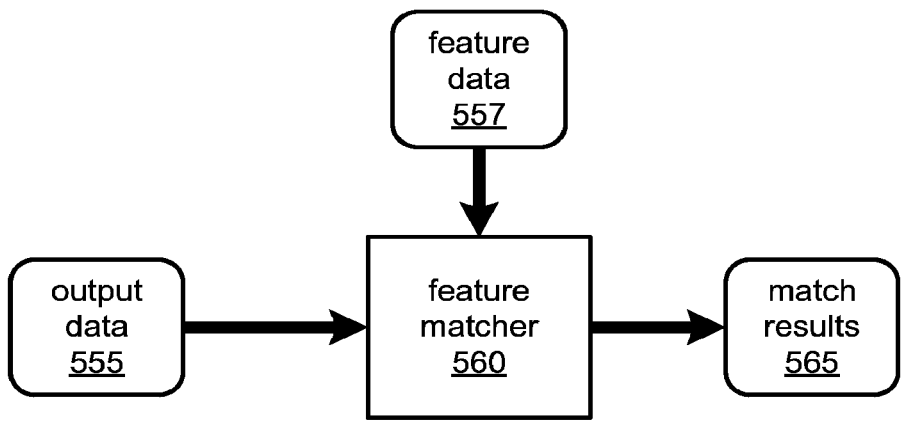
FIG. 5C depicts components of an image processing system, according to some embodiments.

In some embodiments, the image processing system 500 may further include a feature matcher 560, as depicted in FIG. 5C. The feature matcher 560 may comprise digital and/or analog hardware, software executing on at least one processor, at least one field-programmable gate array, or a combination thereof configured to receive output data 555 and feature data 557 and evaluate feature matching between received output data and comparison feature data. The feature data 557 may include reference keypoint data and descriptor data associated with one or more of a plurality of images previously identified and stored, e.g., a plurality of known images in a data store. The feature matcher 560 may be configured to demultiplex received output data 555, so as to parse transformed keypoint data 522, descriptor data 532, and optionally image data and/or metadata if included in output data 555. The feature matcher 560 may also be configured to demultiplex received feature data 557.

The feature matcher 560 may be configured to compare transformed keypoint data 522 and/or descriptor data 532 from the received output data 555 against corresponding keypoint and/or descriptor data from received feature data 557 to determine a match of, track, or recognize, one or more features in image data 502. In some embodiments, feature matcher 560 may perform other machine-vision operations. Any suitable feature matching algorithm may be used, e.g., finding a minimum Hamming distance, or using a matching algorithm described in any of the above-cited references. The feature matcher may output match results 565 that may be used by at least one downstream processing apparatus to make decisions or perform operations based upon the number of matched features or keypoints.

The apparatus depicted in FIGS. 5A-5C may be implemented on a single device, or may be implemented on separate devices. For example, a keypoint extractor 510, keypoint transformer 520, descriptor 530, and multiplexor 550 may be implemented on a first device 100, in some embodiments. In other embodiments, a feature matcher 560 may also be implemented on the device 100. In some implementations, only the keypoint extractor 510 may be implemented on a first device, and in other embodiments, a device 100 (e.g., a smart phone) may provide image data via a network to remote apparatus on which is implemented any combination of the keypoint extractor 510, keypoint transformer 520, descriptor 530, multiplexor 550, and feature matcher 560.

Figure 6:
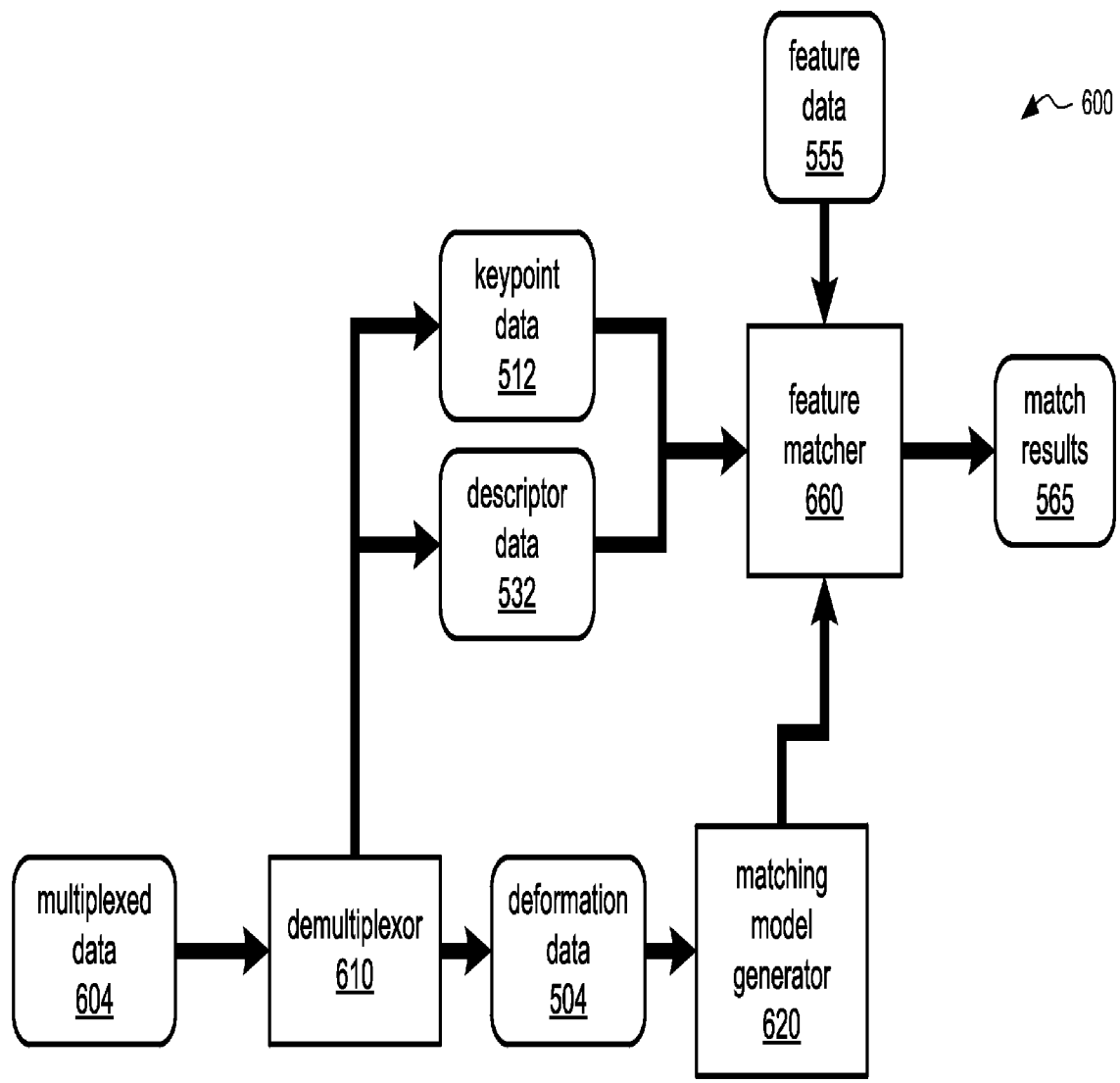
FIG. 6 depicts components of an image processing system, according to some embodiments.

FIG. 6 depicts an embodiment of at least a portion of an image-processing system 600 in which image deformation data 504 is utilized at a downstream location. The portion of the image-processing system 600 may comprise a demultiplexor 610, a feature matcher 660, and a matching model generator 620. The feature matcher may be configured similar the feature matcher described above in connection with FIG. 5C, but further configured to receive data from the matching model generator. The embodiment depicted in FIG. 6 may be implemented in some systems, so as to reduce the data-processing load on upstream image-capture and front-end image-processing apparatus. Keypoint unwarping may be executed at a downstream portion of the image-processing system where greater data-processing resources may be available, or may be executed on a separate device to which data is transferred from an a mobile device 100 that is used for image capture.

The demultiplexor 610 may comprise digital and/or analog hardware, software executing on at least one processor, at least one field-programmable gate array, or a combination thereof configured to receive multiplexed data 604, and parse one or more types of data from the multiplexed data. According to some embodiments, image deformation data 504 that relates to distortion introduced by an image-capture system may be received with the multiplexed data 604. The image deformation data 504 may be demultiplexed from the multiplexed data by the demultiplexor 610 as one type of data and communicated to the matching model generator 620. The demultiplexor may also demultiplex keypoint data 512 and descriptor data 532 that was produced upstream.

Keypoint data 512 may comprise data associated with keypoints identified and extracted from image data 502, and that may not have been transformed according to an image deformation model. The keypoint data 512 and descriptor data 532 may be provided to the feature matcher 660.

The matching model generator 620 may comprise digital and/or analog hardware, software executing on at least one processor, at least one field-programmable gate array, or a combination thereof configured to receive image deformation data 504 and establish rules or generate a model that will be used by the feature matcher 660 to unwarp keypoint data 512. As one example, matching model generator 620 may receive image deformation data 504 and generate or select a parametric equation that can be used to unwarp keypoint data. The generated or selected parametric equation may be communicated to feature matcher 660 where keypoint unwarping may occur. In some embodiments, matching model generator 620 may generate or identify data in a look-up table responsive to analyzing the received image deformation data 504, and communicate or identify the LUT data to the feature matcher. In some implementations, the matching model generator 620 may establish rules or generate a model that will be used by the feature matcher 660 to unwarp keypoint data 512 for an entire image, e.g., unwarp all keypoints in a frame using a same model. In some implementations, the matching model generator 620 may establish rules or generate a model that will be used by the feature matcher 660 to unwarp keypoint data 512 for sub-regions of an image, e.g., multiple rules or multiple models that are used by the feature matcher 660 to unwarp keypoints within a single image.

The feature matcher 660 may be configured to receive keypoint data 512, descriptor data 532, and feature data 555, and further configured to receive data from the matching model generator 620 that is used to unwarp keypoint data 512 prior to feature matching. In some embodiments, the functionality of the feature matcher 660 and matching model generator 620 may be combined or co-implemented on a circuit, e.g., in a FPGA or ASIC, or combined or co-implemented in machine-readable instructions executable by at least one processor.

Figure 7:
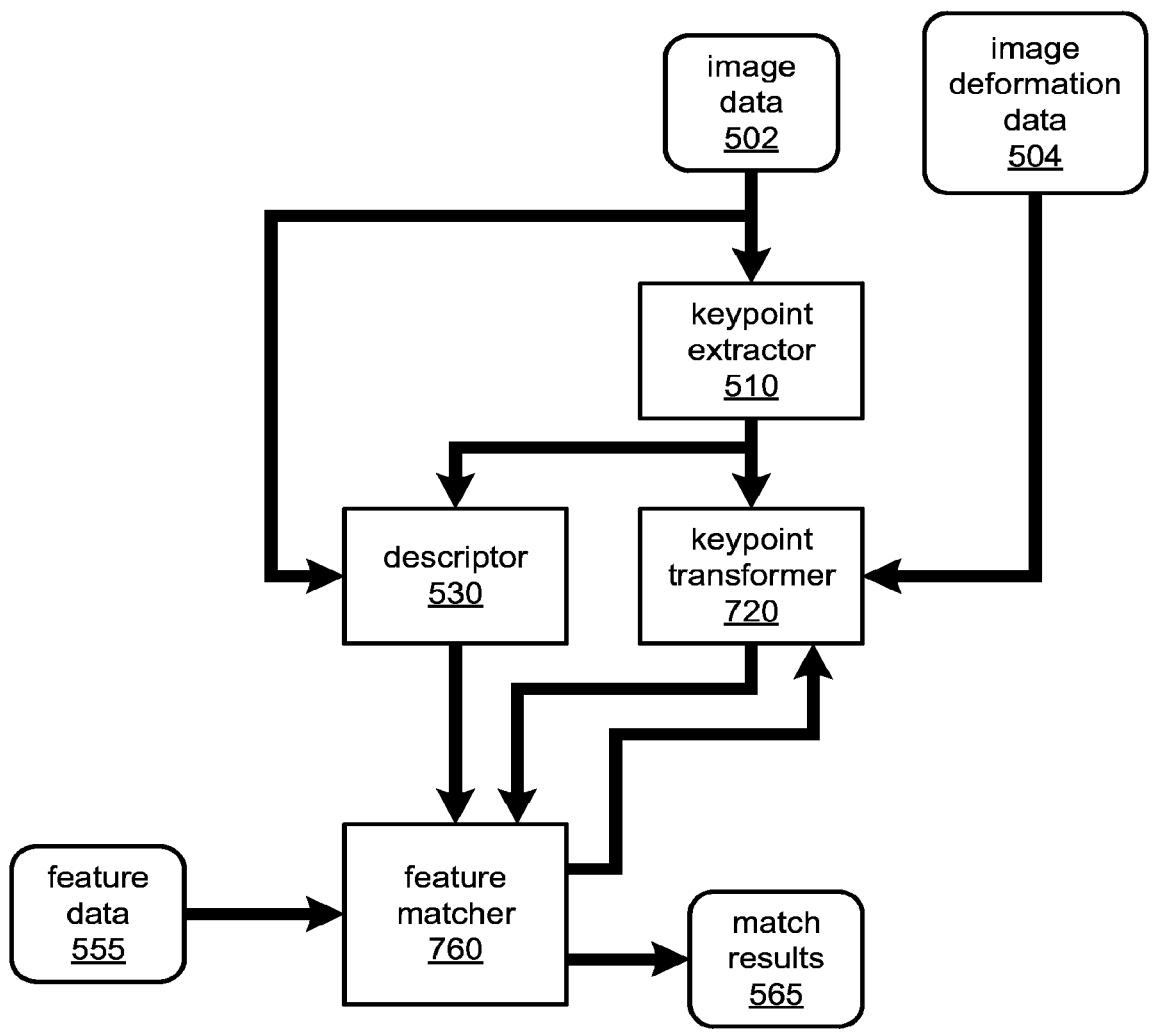
FIG. 7 depicts components of an image processing system, according to some embodiments.

FIG. 7 depicts an embodiment of an image processing system in which feedback may be employed between the feature matcher 760 and keypoint transformer 720. Such a system may be implemented on a device 100 that may include some or all components shown in FIG. 7. The feedback and/or communications may be direct in some embodiments, as shown in FIG. 7, or may be indirect. For example, in some embodiments the feedback and/or communications may be via at least one processor that may communicate with each of the components shown in FIG. 7.

According to some embodiments, it may not always be necessary to unwarp keypoint data 512. For example, when captured images have insignificant distortion or when distortion introduced by the image-capture system matches approximately a distortion present in feature data 555, then it may not be necessary to unwarp keypoint data 512. For instance, when images are captured with a low-distortion, wide-angle lens, and the feature data 555 was generated based upon images obtained with a low-distortion, wide-angle lens, then it may not be necessary to unwarp keypoint data 512. As another example, when images are captured with a fish-eye lens, and feature data 555 was generated based upon images obtained with a fish-eye lens, then it may not be necessary to unwarp keypoint data 512. FIGS. 3A and 3B provide an example of comparing two images obtained with a fish-eye lens in which feature matching is possible without keypoint unwarping.

In some embodiments, an assessment may be made, by feature matcher 760 or a processor in communication with feature matcher, whether keypoint unwarping is needed. If it is determined that images associated with image data 502 and images associated with feature data 555 have been obtained by image-capture systems that introduce similar distortion, then keypoint transformer 720 may not unwarp keypoint data 512. In this manner, keypoint transformer 720 may be enabled or disabled based upon an evaluation of image deformation for acquired image data 502 and available feature data 555.

A determination of image deformation may be made by the image processing system in one or more ways. In some embodiments, a type of image deformation (e.g., fish-eye distortion, barrel distortion, pin-cushion distortion, cylindrical distortion, etc.) may be indicated by the image-capture system and included with acquired image data 502, e.g., associated with the image data as metadata. In some implementations, a type of image deformation may be determined by the image processing system, e.g., by evaluating objects within an image that are normally straight, e.g., building features, light poles, tree trunks.

A decision to enable or disable keypoint transformer 720 and issuing corresponding notifications may be made in various ways. For example and referring again to FIG. 7, keypoint transformer 720 may make the decision and issue a notification based upon received image deformation data 504 and an indication of a distortion for feature data 555 that may be received from feature matcher 760. In some embodiments, feature matcher may make the decision to enable or disable keypoint transformer 720 based upon received feature data 555 and an indication of a distortion for image data 502 that may be received from keypoint transformer 720. In some embodiments, a processor in communication with keypoint transformer and feature matcher may make the decision and issue a notification to enable or disable the keypoint transformer.

Although FIG. 7 shows an embodiment in which feedback and/or communications are employed to enable or disable keypoint unwarper 720, in other embodiments (e.g., for a system as depicted in FIG. 6 where unwarping may occur at a downstream location of an image processing system) feedback and/or communications between a matching model generator 620 and feature matcher 760 and/or processor in communication with these components may be used to enable or disable the matching model generator. For example, matching model generator 620 may not establish rules or generate a model that will be used by the feature matcher 760 to unwarp keypoint data 512 based upon distortions of image data 502 and feature data 555, e.g., if the distortions are substantially similar. For example, matching model generator 620 may make a decision regarding unwarping of data and issue a notification regarding unwarping to feature matcher 760 based upon received image deformation data 504 and an indication of a distortion for feature data 555 that may be received from feature matcher. In some embodiments, feature matcher 760 may make the decision to enable or disable matching model generator 620 based upon received feature data 555 and an indication of a distortion for image data 502 that may be received from the matching model generator or from another source. In some embodiments, a processor in communication with matching model generator and feature matcher may make the decision and issue a notification to enable or disable the matching model generator 620.

Figure 8:
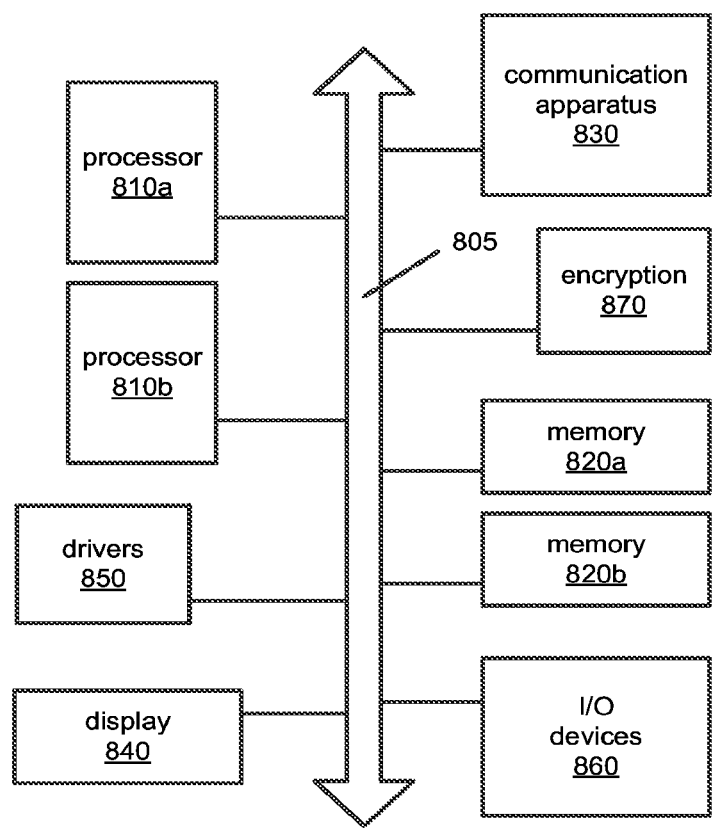
FIG. 8 depicts components of a device 100 that may be used in some embodiments of the present technology.

Referring now to FIG. 8, an electronic device 100 (FIG. 1) that may include at least a portion of an image-processing system 500 described above and/or an image-capture system 102 may further comprise at least one processor 810*a*, 810*b* and related hardware. In some embodiments, the at least one processor may be used to implement, or used in combination with, some or all of the system components described above in connection with FIGS. 5A-5C, FIG. 6, and FIG. 7. The at least one processor may be configured to control and provide user interaction for operating the device 100. When in operation, an operating system may execute on at least one processor and provide for user interaction and operation of the electronic device 100, which may include running multiple software applications and/or programs. The at least one processor may be used in combination with memory 820a, 820b that may be used to store machine-readable instructions, image data 502, feature data, and/or other data associated with image processing. The memory may include any type and form of RAM-type memory device and/or ROM-type memory device. Other data that may be stored may include, but are not limited to, image deformation data, descriptor data, and match results. Some data may be stored temporarily in ring buffers and selectively transferred to long-term storage. Data may be communicated, via a wireless or wired link, to one or more devices in a network.

According to some embodiments, a processor 810a, 810b may comprise any type and form of data processing device, e.g., any one or combination of a microprocessor, microcontroller, a digital signal processor, an application specific integrated circuit (ASIC), and at least one field-programmable gate array (FPGA). There may be more than one processor in the system in some embodiments, e.g., dual core or multi-core processors, or plural processors communicating with at least one controlling processor. In some embodiments, one or more of the image processing system components may be implemented by a dedicated FPGA or ASIC.

The electronic device may further include a display 840 (e.g., comprising any one or combination of a video monitor, an LCD display, a plasma display, an alpha-numeric display, LED indicators, a touch screen, etc.). The electronic device 100 may further include one or more input/output devices 860 (e.g., keyboard, touchpad, buttons, switches, touch screen, microphone, speaker, printer), and communication apparatus 830 (e.g., networking software, networking cards or boards, wireless transceivers, and/or physical sockets). The electronic device 100 may include device drivers 850, e.g., software modules specifically designed to execute on the one or more processor(s) and adapt the processor(s) to communicate with and control system components. In some embodiments, the device may include encryption/decryption hardware and/or software 870 that may be used to encrypt selected outgoing data transmissions and decrypt incoming encrypted data transmissions. Components of the electronic device 100 may communicate over a bus 805 that carries data and control signals between the components. The bus may provide for expansion of the system to include other components not shown in FIG. 8.

Figure 9:
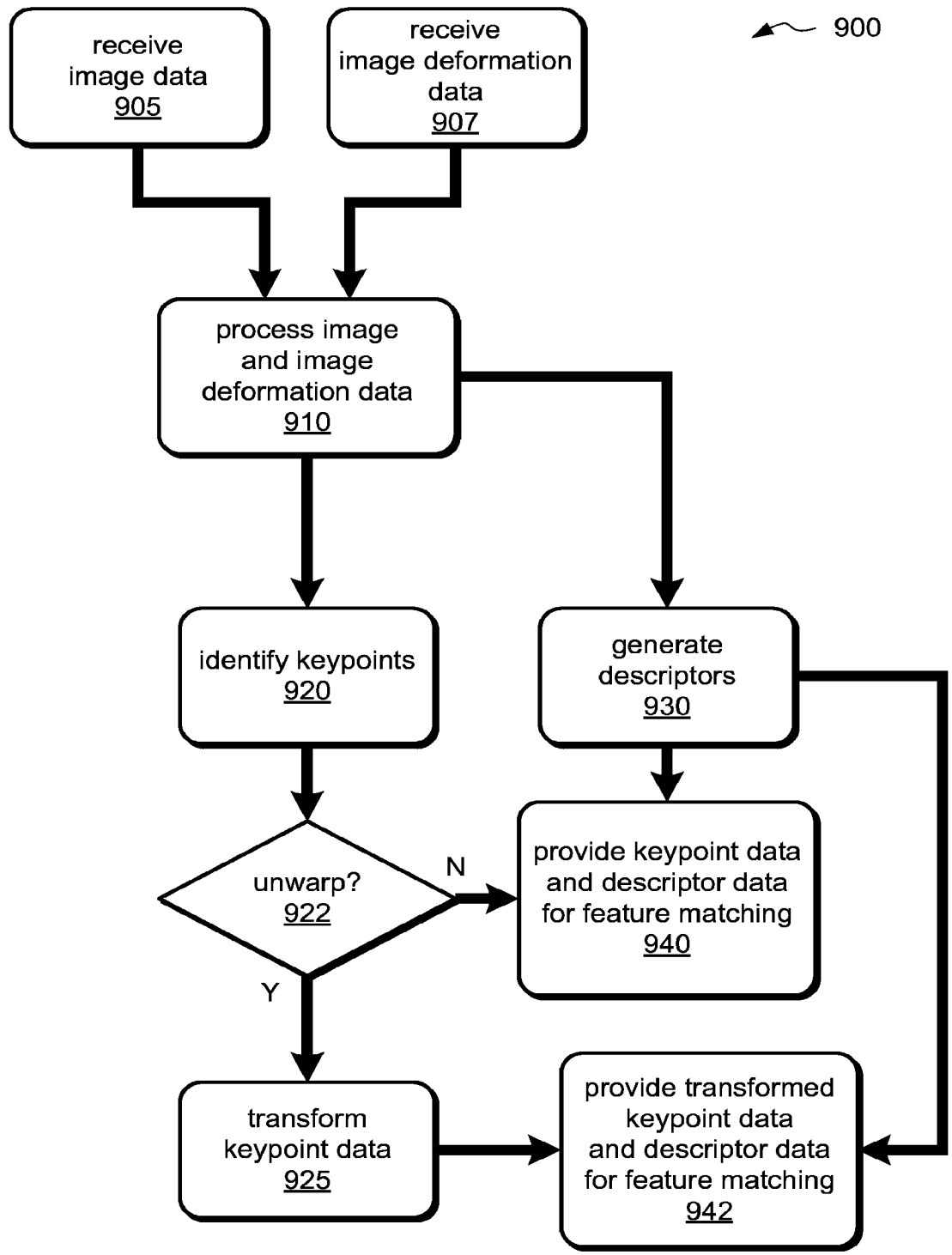
FIG. 9 depicts acts of an image-processing method, according to some embodiments.

An embodiment of an image processing method 900 is depicted in the flow chart of FIG. 9. According to some embodiments, an image processing method may comprise receiving, by an image processing device, image data 905 representative of a first image, and receiving image deformation data 907 that corresponds to image distortion introduced by an image-capture apparatus. The image deformation data may comprise a model of the distortion itself, and/or may comprise a model for an inversion operation that may remove the image distortion. The model may be in the form of a parameterized equation, a look-up table, or a combination thereof. The method 900 may include processing, by at least one processor of the image processing device, the received image and deformation data. The processing may comprise filtering the data in some embodiments, and/or formatting the data for further processing. The method may further comprise identifying 920, by a keypoint extractor, a plurality of keypoints within the image data, and generating 930, by a descriptor, descriptor data for at least some of the plurality of keypoints. When implemented as machine-readable instructions, the identifying 920 a plurality of keypoints and the generating 930 descriptor data may execute on multiple computational threads or may execute on a single thread. In some embodiments, the keypoint extractor, may process an image to produce first keypoint data corresponding to the plurality of identified keypoints or interest points within the image. The keypoint data produced may include spatial positions of the identified keypoints, and may further include at least one orientation angle associated with at least one keypoint and/or at least one scale or magnification factor associated with the at least one keypoint.

The method 900 of image processing may further include testing 922 to determine whether keypoints need to be unwarped. If it is determined that keypoints do not need to be unwarped, then extracted keypoint data 512 and descriptor data may be provided 940 as output for subsequent feature matching. If it is determined that keypoints need to be unwarped, then extracted keypoint data 512 may be transformed 925 so as to substantially remove image distortion introduced by an image capture system. In some embodiments, transforming operation 925 may introduce a distortion commensurate with distortion present in feature data 555 to which the image will be compared. The transformed keypoint data and descriptor data may be provided 942 as output for subsequent feature matching.

The technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Additionally, a method may include more acts than those illustrated, in some embodiments, and fewer acts than those illustrated in other embodiments.

Having thus described at least one illustrative embodiment of the disclosure, various alterations, modifications, and improvements will readily occur to those skilled in the art. Such alterations, modifications, and improvements are intended to be within the spirit and scope of the disclosure. Accordingly, the foregoing description is by way of example only and is not intended as limiting. The disclosure is limited only as defined in the following claims and the equivalents thereto.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A non-transitory computer-readable medium having contents which configure an image processing system to perform a method, the method comprising:
comparing a first image to feature data of a comparison image in an image space using a matching model, the comparing including:
identifying keypoints in image data of the first image;
determining whether to unwarp the identified keypoints;
in response to a determination to unwarp the identified keypoints:
unwarping the identified keypoints; and
comparing the unwarped, identified keypoints and descriptor data associated with the first image to the feature data of the comparison image; and
in response to a determination not to unwarp the identified keypoints, comparing the identified keypoints and descriptor data associated with the first image to the feature data of the comparison image; and
determining whether the first image matches the comparison image based on the comparing.

2. A system, comprising:
an image capture device, which, in operation, captures images; and
image processing circuitry, which, in operation:
compares a first image to feature data of a comparison image in an image space using a matching model, the comparing including:
identifying keypoints in image data of the first image;
determining whether to unwarp the identified keypoints;
in response to a determination to unwarp the identified keypoints:
unwarping the identified keypoints; and
comparing the unwarped, identified keypoints and descriptor data associated with the first image to the feature data of the comparison image; and
in response to a determination not to unwarp the identified keypoints, comparing the identified keypoints and descriptor data associated with the first image to the feature data of the comparison image; and
determines whether the first image matches the comparison image based on the comparing.

3. The system of claim 2 wherein the image capture device, in operation, captures the first image.

4. The system of claim 2, comprising a display screen.

5. The system of claim 2 wherein the system is a vehicle.

6. The system of claim 2 wherein the image processing circuitry, in operation, generates the descriptor data using a keypoint algorithm selected from a SIFT, SURF, and a CHoG algorithm.

7. The system of claim 2, wherein the image processing circuitry, in operation, performs machine vision functions based on the comparing.

8. An image processing system, comprising:
one or more memories; and
image processing circuitry coupled to the one or more memories, wherein the image processing circuitry, in operation:
compares a first image to feature data of a comparison image in an image space using a matching model, the comparing including:
identifying keypoints in image data of the first image;
determining whether to unwarp the identified keypoints;
in response to a determination to unwarp the identified keypoints:
unwarping the identified keypoints; and
comparing the unwarped, identified keypoints and descriptor data associated with the first image to the feature data of the comparison image; and
in response to a determination not to unwarp the identified keypoints, comparing the identified keypoints and descriptor data associated with the first image to the feature data of the comparison image; and
determines whether the first image matches the comparison image based on the comparing.

9. The image processing system of claim 8 wherein the image processing circuitry, in operation:
selects the matching model based on image deformation data.

10. The image processing circuitry of claim 9 wherein the image processing circuitry, in operation:
unwarps identified keypoints in the keypoint data based on the selected matching model.

11. The image processing circuitry of claim 10 wherein the image processing circuitry, in operation:
compares the unwarped, identified keypoints and descriptor data to the feature data based on the selected matching model.

12. The image processing circuitry of claim 9 wherein the image processing circuitry, in operation:
compares the unwarped, identified keypoints and descriptor data to the feature data based on the selected matching model.

13. The image processing system of claim 9 wherein selecting the matching model comprises generating the matching model based on image deformation data.

14. The image processing system of claim 9 wherein the image deformation data is representative of an image distortion introduced by an image-capture device.

15. The image processing system of claim 9 wherein the image deformation data is representative of an operation to remove image distortion introduced by an image-capture device.

16. The image processing system of claim 8 wherein the image processing circuitry comprises a field-programmable gate array.

17. The image processing system of claim 8 wherein the image processing circuitry comprises a demultiplexor, which, in operation, parses keypoint data, descriptor data and image deformation data from received data.

18. The image processing system of claim 8 wherein the image processing circuitry, in operation,
selects the matching model based on a type of image distortion in the first image and a type of image distortion in the feature data of the comparison image.

19. The image processing system of claim 18 wherein the image processing circuitry, in operation, selectively disables use of the matching model based on the type of image distortion in the first image and the type of image distortion in the feature data of the comparison image.

* * * * *